(12) United States Patent
Cheng et al.

(10) Patent No.: US 7,860,350 B2
(45) Date of Patent: *Dec. 28, 2010

(54) METHOD AND DEVICE FOR DRAWING AND FORMATTING IMAGE

(76) Inventors: Stone Cheng, 187, Ping-Teng Rd., Tzu-Kuan Hsiang, Kaohsiung (TW); Shih-Wen Chen, 33, Lane 170, Sec. 3, Chung-Yang Rd.,Chung-Ho Tsun, Lung-Ching, Taichung (TW)

(*) Notice: Subject to any disclaimer, the term of this patent is extended or adjusted under 35 U.S.C. 154(b) by 1167 days.

This patent is subject to a terminal disclaimer.

(21) Appl. No.: 11/507,085

(22) Filed: Aug. 18, 2006

(65) Prior Publication Data

US 2006/0280383 A1    Dec. 14, 2006

Related U.S. Application Data

(62) Division of application No. 10/251,214, filed on Sep. 20, 2002, now Pat. No. 7,327,906.

(51) Int. Cl.
*G06K 9/29* (2006.01)

(52) U.S. Cl. .................................. 382/321; 382/318

(58) Field of Classification Search ................. 382/312, 382/321, 178, 318–319; 358/1.9, 406, 474, 358/453, 527
See application file for complete search history.

(56) References Cited

U.S. PATENT DOCUMENTS

| | | | |
|---|---|---|---|
| 6,385,351 B1 * | 5/2002 | Simske et al. | 382/312 |
| 6,542,173 B1 | 4/2003 | Buckley | |
| 7,327,906 B2 * | 2/2008 | Cheng et al. | 382/321 |
| 2002/0085244 A1 * | 7/2002 | Blasio et al. | 358/474 |
| 2002/0114021 A1 * | 8/2002 | Lavender et al. | 358/474 |

* cited by examiner

*Primary Examiner*—Duy M Dang
(74) *Attorney, Agent, or Firm*—Stolowitz Ford Cowger LLP

(57) ABSTRACT

Whenever a user prepares to use an application, or a file, to treat the scanned image of an object, the user only needs to place the object on a scanner and to select the icon of the application, or the file, and compile it with the icon of the scanner. The utilization of the present invention will automatically drive the driver of the scanner and integrate the relative information into the driver. Thus, after the scanned image is acquired, the application, or relative application of the file, is automatically active to treat the scanned image. Further, the format of the scanned image could be transformed by some applications such as the OCR.

28 Claims, 4 Drawing Sheets

METHOD AND DEVICE FOR DRAWING AND FORMATTING IMAGE

CROSS-REFERENCE TO RELATED APPLICATIONS

This is a Divisional Patent Application of U.S. patent application Ser. No. 10/251,214, filed Sep. 20, 2002, now U.S. Pat. No. 7,327,096.

BACKGROUND OF THE INVENTION

1. Field of the Invention

The present invention generally relates to a method for drawing and formatting an image, and more particularly to a method and device to treat a scanned image by using a program or a file by selecting a scanner icon and a program icon (or a file icon).

2. Description of the Prior Art

In the conventional technologies, there are two common methods for a user to use a program and/or a file to treat an image acquired from scanning an object:

The first method, as shown by activating scanner block 11, setting up scanning block 12 and activating program block 13 of FIG. 1A. The user needs to sequentially activate (call) the driver (such as VistaSCan), set up the path to operate the scanner with corresponding programs and/or files, and treat the scanned image by the activated program and/or file after the operation of the scanner is finished.

The second method, as shown by activating block 14, driving block 15 and treating block 16 of FIG. 1B. The user needs to sequentially activate a program and/or a file which supports the TWAIN interface, use the program (file) to drive the scanner, and use the program (file) to treat the scanned image acquired by scanning.

Indisputably, both methods have unavoidable defects. For the first method the operating steps are complicated, and the user must perform all the steps for setting up scanning block 12. For the second method, although it is not necessary to set up the program and file path before scanning, not every program and file supports the TWAIN interface.

Therefore, it's a desired objective to enhance the users scanning convenience, by providing the freedom to use a current scanning process without supporting the TWAIN interface.

SUMMARY OF THE INVENTION

An object of the present invention is to simplify the scanning process by eliminating the need for the user to certify the path of programs and files prior to scanning the image.

Another object of the present invention is to easily acquire a scanned image regardless of whether a TWAIN interface is supported.

A main characteristic of the present invention is similar to the function in the current operations system, which two different programs (or files) could interact with each other while their corresponding icons are overlapped. For example, in the current operation of the windows system, if a file icon is drawn into the "recycle bin" icon, the icon functions, file and recycle, are then combined to delete the file. In comparison, in the present invention, the user only needs to select and draw a non-scanned icon that corresponds to a file or a program, into a scanned icon that corresponds to a scanner. The functions of both the non-scanned icon and the scanned icon are automatically activated to scan the image.

Another main characteristic of the present invention is described as follows. While a non-scanned icon is overlapped with a scanned icon, the contents of both icons are first analyzed for scanning, the driver is then activated and the program (file) information, such as path, are automatically integrated into the driver. Hence, after an image is acquired by a scanning operation, the image could be treated by an automatically activated program (or corresponding program of the file). Further, some programs, such as the optical character recognition program (OCR program), could be used to transfer the image into a format that is acceptable for the activated program.

Clearly, this invention allows the user to scan without setting up a path, and allows the user to scan without considering whether the TWAIN interface is supported. While a scanning operation is required, one only needs to put the object on the scanner, to decide whether the program (or file) would be used to treat the scanned image, and to draw the icon(s).

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DESCRIPTION OF THE EMBODIMENTS

Figure 1A:
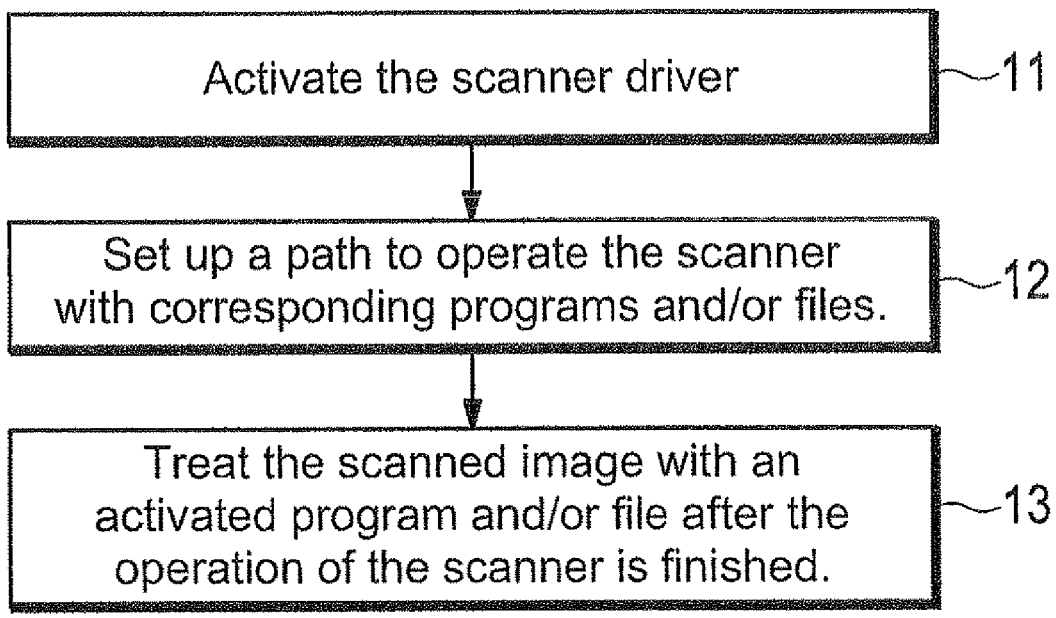
FIG. 1A and FIG. 1B are two flow-charts that shows the conventional steps performed by a user while a program (or a file) would be used to treat a scanned file.
Figure 1B:
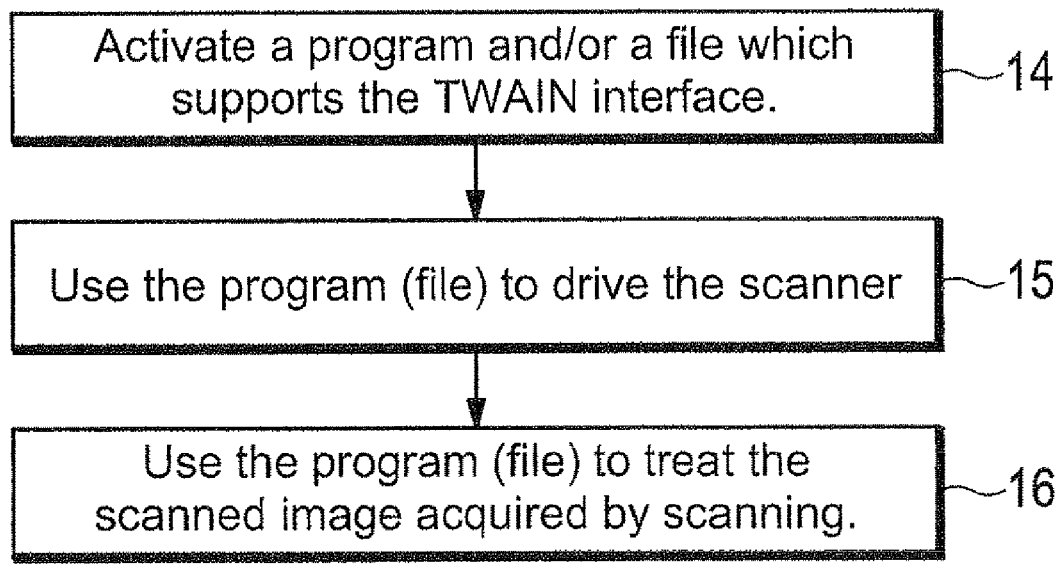
Figure 2A:
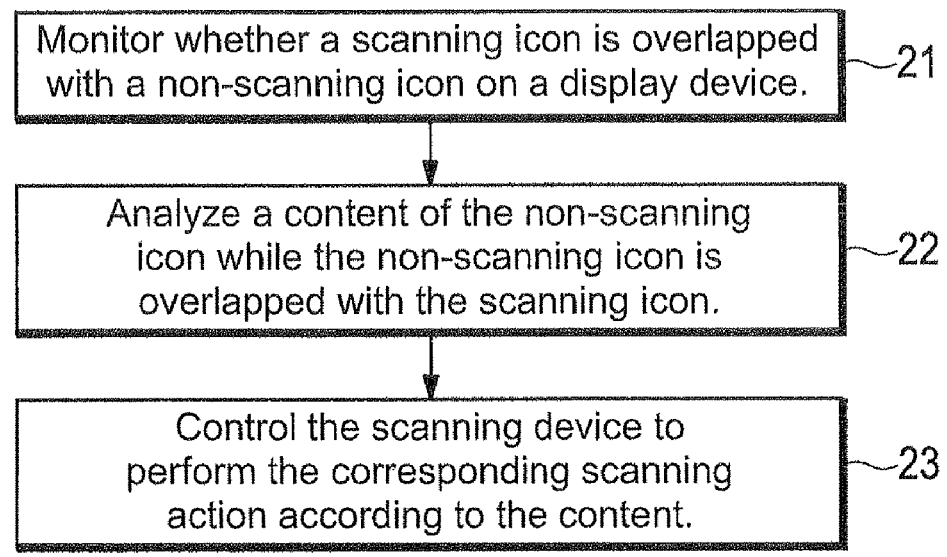
FIG. 2A to FIG. 2C shows three possible flow-charts of embodiments of the present invention.

According to the previous discussions, one preferred embodiment of the invention is a method for drawing and formatting images as shown in FIG. 2A, and at least comprises the following steps:

As shown in monitoring block 21, a monitoring process is performed to monitor whether a scanned icon is overlapped with a non-scanned icon on a display device.

As shown in analyzing block 22, an analyzing process is performed to analyze the content of the non-scanned icon while the non-scanned icon is overlapped with the scanned icon.

As shown in controlling block 23, a controlling process is performed to control the scanning device to perform the corresponding scanning action according to the content.

Figure 2B:
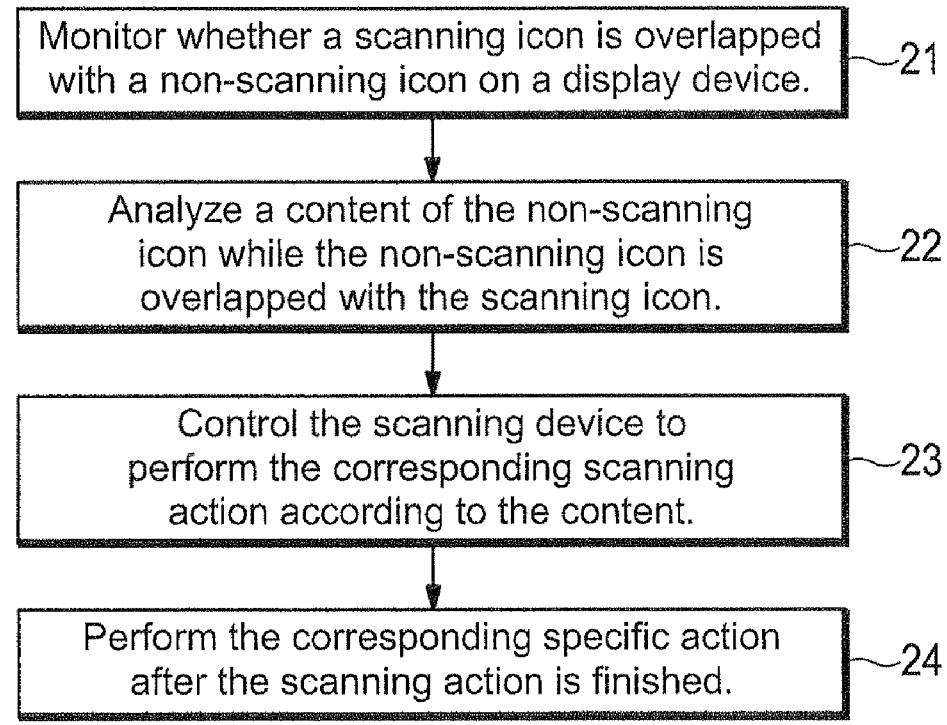

Certainly, as shown in FIG. 2B, the preferred embodiment could perform a processing block 24 and the corresponding specific action after the scanning action and the performing block 23 is finished. For example, if the corresponding file to the non-scanned icon is a TEXT file that is unable to treat an image, the corresponding specific action could use an optical character recognition process to treat an image acquired by the scanning action.

In the embodiment, the analyzing process decides which specific program or specific file corresponds with the non-scanned icon. Herein, the decision could be achieved by simply referring to the files of these icons in the corresponding operating system.

In addition, the analyzing process could decide whether the specific file is distinguishable and what is the corresponding program of the specific file. For example, by referring to the files of these icons in the operating system, it is possible to handle both the name and the path of the corresponding program, and its also possible to activate the specific program for checking whether the specific program is performable.

Further, the controlling process could set up the path of the specific program while the scanning device is activated, according to the corresponding file of the non-scanned icon in the operating system. Thus, the specific program could automatically treat an image acquired by the scanning action after the scanning action is finished.

Similarly, the controlling process could set up a path for the corresponding program of the distinguishable file while the scanning device is activated. Hence, the corresponding program could automatically treat an image acquired by the scanning action after the scanning action is finished.

Furthermore, while the non-scanner icon corresponds to a non-distinguishable specific file, the controlling process could send a warning message without activating the scanning device. Similarly, while the specific program is non-available, the controlling process could send a warning message without activating the scanning device.

Figure 2C:
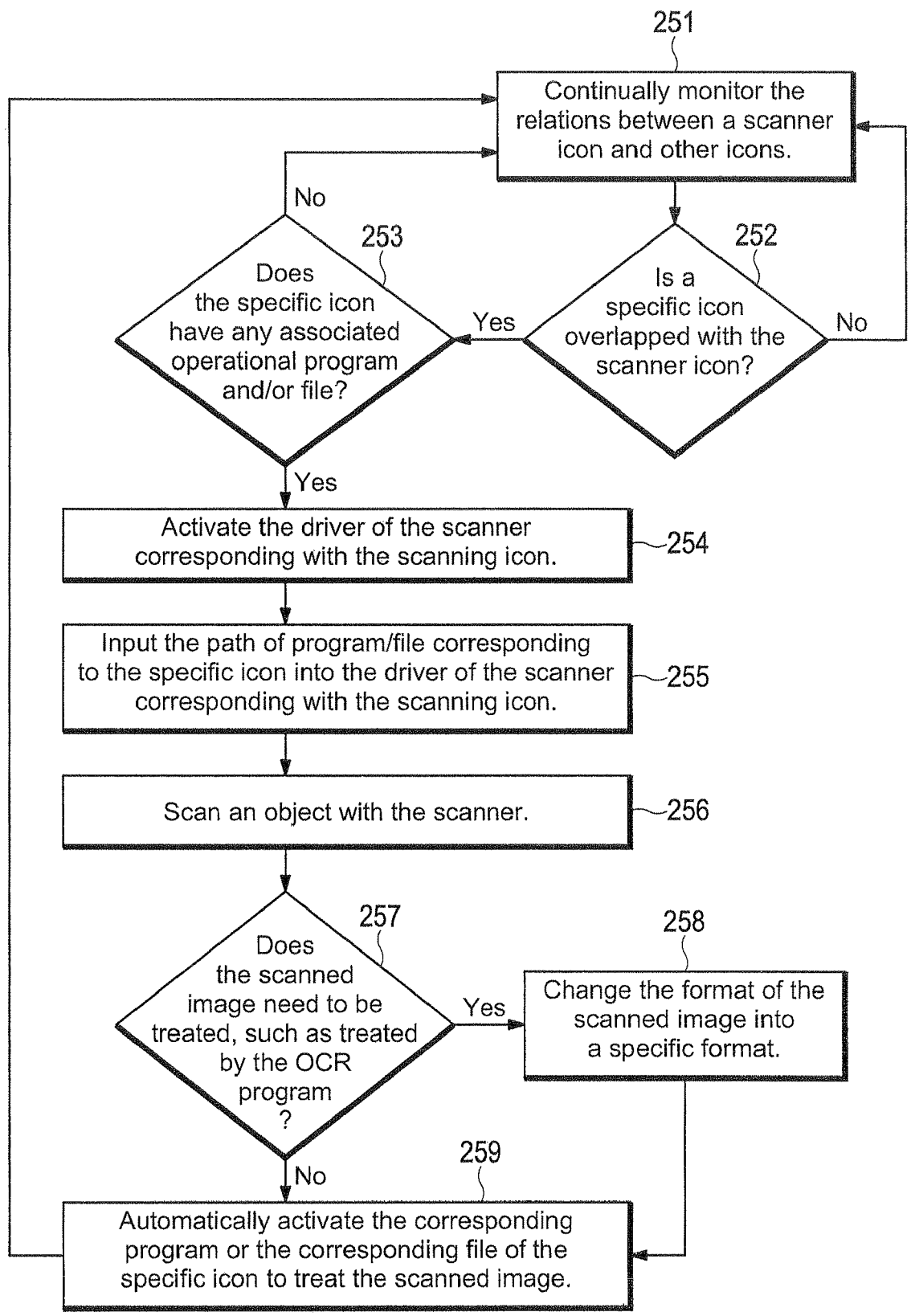

To further explain the possible amendments of the embodiment, FIG. 2C shows a possible amendment of the embodiment:

As shown in tracking block 251, a continuous monitoring between the relations of the scanner icon and other icons is performed.

As shown in the first decision block 252, it's determined whether a specific icon is overlapped with the scanner icon. If the answer is yes, the second decision block 253 is performed. Otherwise, tracking block 251 will continually perform.

As shown in the second decision block 253, it's determined which is the corresponding program or corresponding file for the specific icon. If it can not be determined or it's not distinguishable, the tracking block 251 will continually perform and send a warning message, if necessary. Otherwise, the activating block 254 is performed.

As shown in activating block 254, the active driver of the scanner corresponds with the scanned icon.

As shown in integrating block 255, the path for the program/file corresponding to the specific icon is input into the driver of the scanner corresponding to the scanned icon.

As shown in scanning block 256, scan an object by the scanner.

As shown in third deciding block 257, a determination is made whether the scanned image needs to be treated, such as the OCR program. Herein, information, such as the path of corresponding program/file, of the specific icon is used to decide whether the corresponding program/file could directly treat the scanned image or the format of the scanned image needs to be changed.

As shown in the extra processing block 258, the format of the scanned image is changed into a specific format while the answer of third deciding block 327 is necessary.

As shown in the automatically activating block 259, after both the third deciding block 257 and extra processing block 258 are finished, the specific icon of the corresponding program/file is automatically activated to treat the scanned image, and the format of the scanned image may be possibly changed.

Certainly, after the automatically activating block 259 is finished, the tracking block 251 is automatically performed again except if the user sends a new order.

Figure 3A:
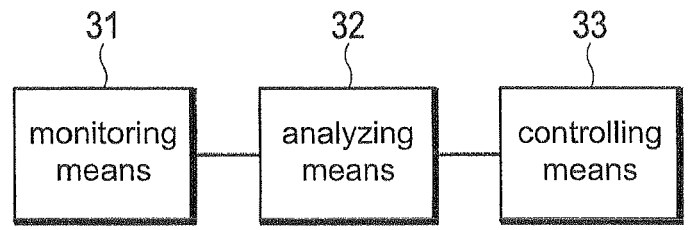
FIG. 3A and FIG. 3B shows other embodiments of the present invention.
Figure 3B:
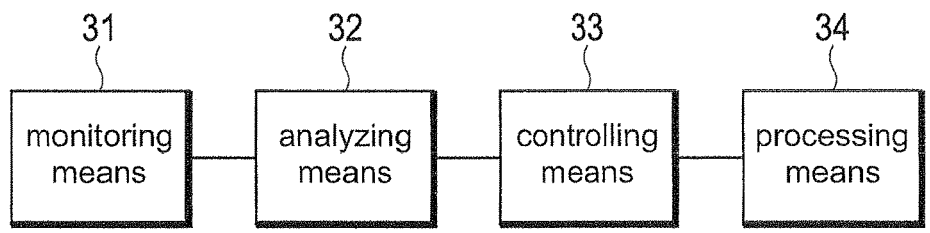

Another preferred embodiment of the invention is a device for drawing and formatting an image. As shown in FIG. 3A and FIG. 3B, at least a monitoring means 31, analyzing means 32 and a controlling means 33 is provided, and could further include a processing means 34.

Monitoring means 31 is used to monitor whether a scanned icon is overlapped with a non-scanned icon on a display device. Analyzing means 32 is used to analyze the content of the non-scanned icon while the non-scanned icon is overlapped with the scanned icon. Controlling means 33 is used to control a scanning device to perform a corresponding scanning action according to the content. And a processing means 34 is used to automatically activate a program and/or file, which corresponds to the non-scanned icon, to treat the image acquired by the scanning action after the scanning action is finished.

By comparing with the previous embodiment, the monitoring means 31 corresponds to monitoring block 21, analyzing means 32 corresponds to analyzing block 22, controlling means 33 corresponds to controlling block 33, and the processing means 34 corresponds to processing block 34. In other words, each means is limited by the function of its corresponding block, but is not limited how to form the means. In short, each means could be hardware, such as a microprocessor or integrated circuits, or software, such as program or operating system, a firmware, or a combination of hardware/software/firmware. The embodiment is never limited on how to form each means.

Therefore, the analyzing means 32 could decide a non-scanned icon corresponds to a specific program or a specific file. Analyzing means 32 could decide whether the specific file is distinguishable and what's the corresponding program of the specific file. Controlling means 33 could set up the path for the specific program while the scanning device is activated, such that an image acquired by the scanning action is automatically treated by a specific program after the scanning action is finished. Controlling means 33 could set up the path of the corresponding program of a distinguishable file while the scanning device is activated, such that an image acquired by the scanning action is automatically treated by the corresponding program after the scanning action is finished. Controlling means 33 could send a warning message without activating the scanning device while the non-scanner icon corresponds to a non-distinguishable specific file. Controlling means 33 could send a warning message without activating said scanning device while said specific program is non-available. Controlling means 33 further could perform a corresponding specific action after the scanning action is finished. Herein, possible corresponding specific actions could use an optical character recognition process to treat an image acquired by the scanning action.

Figure 4:
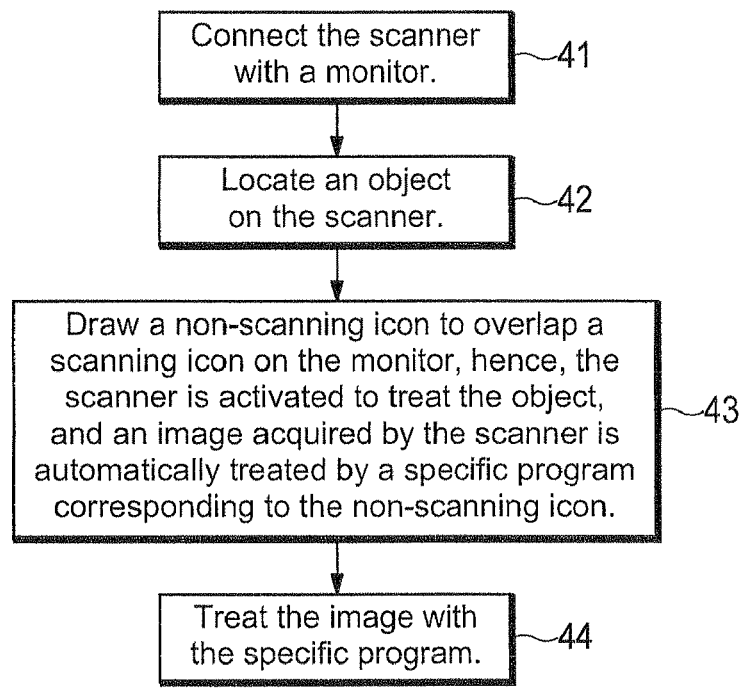
FIG. 4 shows the flow-chart of another embodiment of the present invention

The other preferred embodiment of the invention is present from the viewpoint of the user: a method for using a scanner with the functions of drawing and formatting an image. As show in FIG. 4, at least the following steps are provided:

As shown in the first preparation block 41, the scanner connected with a monitor.

As shown in second preparation block 42, an object is located on the scanner.

As shown in icon operation block 43, draw a non-scanned icon to overlap a scanned icon on the monitor, Hence, the scanner is activated to treat the object and an image acquired by the scanner is automatically treated by a specific program corresponds to the non-scanned icon.

However, the embodiment is not limited to only draw the non-scanned icon. In fact, any operation could let the non-scanned icon and the scanned icon be overlapped is available for the embodiment. Herein, the scanned icon corresponds to the scanner and the non-scanned icon corresponds to a program or the file.

As shown in treat block 44, treat the image by a specific program.

Significantly, one main characteristic of the embodiment is that the user only needs to operate the icons. The user need not to set up the details of the program/file to be used before/after the operation of the scanner, the user also need not to consider whether the TAWAN interface is supported by the program/file to be used.

Of course, it is to be understood that the invention need not be limited to these disclosed embodiments. Various modifications and similar changes are still possible within the spirit of this invention. In this way, the scope of this invention should be defined by the appended claims.

What is claimed is:

1. A method, comprising:
   pre-scanning an object with a scanning device;
   forming a pre-scanned icon on a display, wherein the pre-scanned icon is associated with a pre-scanned image of the object obtained from said pre-scanning; and
   treating the pre-scanned image of the object using a file associated with a non-scanned icon in response to the non-scanned icon partially overlapping the pre-scanned icon on the display.

2. The method of claim 1, wherein the file comprises a software program.

3. The method of claim 1, further comprising:
   analyzing data associated with the pre-scanned image; and
   initiating a scan to scan the object in accordance with the analyzed data.

4. The method of claim 3, wherein said analyzing comprises determining content of the pre-scanned image.

5. The method of claim 1, wherein said treating comprises initiating a character recognition program.

6. The method of claim 1, wherein said pre-scanning the object comprises pre-scanning the object on a scanner, and wherein the display is a monitor coupled to the scanner.

7. The method of claim 1, wherein said treating the pre-scanned image includes setting up a path.

8. An apparatus, comprising:
   a scanning device for pre-scanning an object;
   means for forming a pre-scanned icon on a display, wherein the pre-scanned icon is associated with a pre-scanned image of the object obtained from the scanning device; and
   means for treating the pre-scanned image of the object by using a file associated with a non-scanned icon in response to the non-scanned icon partially overlapping the pre-scanned icon on the display.

9. The apparatus of claim 8, wherein the file comprises a software program.

10. The apparatus of claim 8, further comprising:
    means for analyzing data associated with the pre-scanned image; and
    means for initiating a scan to scan the object in accordance with the analyzed data.

11. The apparatus of claim 10, wherein the means for analyzing comprises means for determining content of the pre-scanned image.

12. The apparatus of claim 8, wherein the means for treating comprises means for initiating a character recognition program.

13. The apparatus of claim 8, wherein the scanning device comprises a scanner, and wherein the display comprises a monitor coupled to the scanner.

14. A non-transitory storage medium having stored thereon computer-executable instructions that, in response to execution by a computing system, cause the computing system to perform operations comprising:
    pre-scanning an object;
    forming a pre-scanned icon on a display, wherein the pre-scanned icon is associated with a pre-scanned image of the object obtained from said pre-scanning; and
    treating the pre-scanned image of the object using a file associated with a non-scanned icon in response to the non-scanned icon partially overlapping the pre-scanned icon on the display.

15. The storage medium of claim 14, wherein the file comprises a software program.

16. The storage medium of claim 14, wherein the operations further comprise:
    analyzing data associated with the pre-scanned image; and
    initiating a scan to scan the object in accordance with the analyzed data.

17. The storage medium of claim 16, wherein said analyzing comprises determining content of the pre-scanned image.

18. The storage medium of claim 14, wherein the operations further comprise initiating a character recognition program.

19. The storage medium of claim 14, wherein said pre-scanning the object comprises pre-scanning the object on a scanner, and wherein the display is a monitor coupled to the scanner.

20. The storage medium of claim 14, wherein said treating the pre-scanned image includes setting up a path.

21. The storage medium of claim 14, wherein the operations further comprise identifying when the non-scanned icon partially overlaps the pre-scanned icon on the display.

22. The storage medium of claim 14, wherein said treating the pre-scanned image of the object includes operations comprising performing a scanning action corresponding to the file.

23. An apparatus, comprising:
    one or more processors configured to:
    pre-scan an object;
    form a pre-scanned icon on a display, wherein the pre-scanned icon is associated with a pre-scanned image of the object obtained from said pre-scanning; and
    treat the pre-scanned image of the object using a file associated with a non-scanned icon in response to the non-scanned icon partially overlapping the pre-scanned icon on the display.

24. The apparatus of claim 23, wherein the one or more processors are further configured to:
    analyze data associated with the pre-scanned image; and
    initiate a scan to scan the object in accordance with the analyzed data.

25. The apparatus of claim 24, wherein the data analysis comprises determining content of the pre-scanned image.

26. The apparatus of claim 23, wherein the pre-scanned image treatment comprises initiating a character recognition program.

27. The apparatus of claim 23, wherein the non-scanned icon partially overlaps the pre-scanned icon on the display in response to a user manipulation of the non-scanned icon on the display.

28. The apparatus of claim 27, wherein the non-scanned icon is drawn to the pre-scanned icon by the user manipulation.

* * * * *

UNITED STATES PATENT AND TRADEMARK OFFICE
CERTIFICATE OF CORRECTION

| | |
|---|---|
| PATENT NO. | : 7,860,350 B2 |
| APPLICATION NO. | : 11/507085 |
| DATED | : December 28, 2010 |
| INVENTOR(S) | : Cheng et al. |

It is certified that error appears in the above-identified patent and that said Letters Patent is hereby corrected as shown below:

Title page, item (57), under "Abstract", in Column 2, Line 1, delete "Whenever" and insert -- Method and device for drawing and formatting image. Whenever --.

Column 1, lines 8-9, delete "Sep. 20, 2002 , now U.S. Pat. No. 7,327,096." and insert -- Sep. 20, 2002, now U.S. Pat. No. 7,327,906. --.

Column 6, line 16, in Claim 16, delete "comprise:" and insert -- comprises: --.

Signed and Sealed this
Twenty-fourth Day of May, 2011

David J. Kappos
*Director of the United States Patent and Trademark Office*